CENTRIFUGAL CLUTCH

Original Filed Oct. 24, 1969 2 Sheets-Sheet 1

INVENTOR.
EUGENE W. LAUGHLIN
BY
Merchant & Gould
ATTORNEYS

CENTRIFUGAL CLUTCH

Original Filed Oct. 24, 1969 2 Sheets-Sheet 2

INVENTOR
EUGENE W. LAUGHLIN
BY
Merchant & Gould
ATTORNEYS

United States Patent Office

Re. 27,858
Reissued Jan. 1, 1974

27,858
CENTRIFUGAL CLUTCH

Eugene W. Laughlin, Minneapolis, Minn., by Textron, Inc., assignee, Providence, R.I.

Original No. 3,605,510, dated Sept. 20, 1971, Ser. No. 869,165, Oct. 24, 1969. Application for reissue Sept. 20, 1972, Ser. No. 290,631
Int. Cl. F16h *55/52*
U.S. Cl. 74—230.17 E 16 Claims

Matter enclosed in heavy brackets [ ] appears in the original patent but forms no part of this reissue specification; matter printed in italics indicates the additions made by reissue.

ABSTRACT OF THE DISCLOSURE

The disclosure is directed to a variable ratio centrifugal clutch having driving and driven assemblies connected by an endless belt. The driving assembly consists of a pair of sheaves affixed to a drive shaft, one being axially stationary and the other being axially movable with respect thereto. The movable sheave forms part of a closed housing which fully encloses a plurality of flyweights pivotally mounted on the shaft for rotation therewith. In response to increases in drive shaft speed, the flyweights swing outward and engage the housing, moving it in its entirety along the shaft to bring the sheaves together.

The invention falls within the art of centrifugal clutches generally, and is specifically directed to centrifugal clutches consisting of driving and driven assemblies that vary the ratio of input shaft rotation to output shaft rotational.

Centrifugal clutches of this specific type find particular application in conjunction with smaller internal combustion engines where the use of gear transmission is impractical or too clostly. By providing a variable ratio of input to output rotational speed, the clutch serves as both clutch and transmission.

The driving assembly of a variable ratio centrifugal clutch ordinarily consists of a pair of sheaves mounted for rotation on a drive shaft, one of the sheaves being axially stationary on the shaft and the other being axially movable to effect the clutch operation. The position of the movable sheave is governed by a plurality of flyweights that rotate with the shaft and are mounted to swing radially outward in response to increase in shaft speed. The flyweights include cam surfaces, and through engagement with cooperating cam follower surfaces the sheave is moved axially along the shaft.

Since proper operation of the clutch is dependent on movement of the flyweights, it is imperative that all of the moving parts, including flyweights, pivotal connections, cam and cam following surfaces, be kept clean and protected from dirt, mud and other potentially damaging substances.

An obvious solution to the problem is to enclose the moving parts in a housing that revolves with the drive shaft. However, this raises the further problem of axial movement of the enclosure and maintaining the protection of moving parts throughout the range of axial movement of the movable sheave. Existing clutch assemblies solve this problem through the use of a telescoping housing, part of which remains stationary and part of which moves with the movable sheave. This is not a completely satisfactory solution since the telescoping surfaces are capable of carrying dirt into the housing, particularly where the telescoping surfaces separate at the furthest axial position of the movable sheave. The resulting gap is also extremely unsafe since it allows the escape of broken or loosened parts from the enclosure.

Another disadvantage of telescoping enclosures is the inherent lack of connecting support between the enclosure sections. The telescoping extension of the movable section is generally unsupported thereby placing a good deal of strain on the sliding bearing. Consequently, misalignment of this section is more likely, not to mention the difficulty in affixing the section to the shaft for balanced rotation therewith.

My invention is believed to solve these problems through the provision of an enclosed housing part of which forms the movable sheave, and which is entirely movable on the shaft. Within the enclosure is disposed an axially stationary frame that rotates with the shaft and pivotally carries the flyweights. For increases in shaft speed the flyweights engage the housing to effect axial movement with respect to the stationary sheave and thereby perform the desired clutching function.

The inventive clutch assembly offers full protection from dirt at all times, fully encloses the moving parts at all times and is structurally sound throughout.

DESCRIPTION OF THE PREFERRED EMBODIMENT

Figure 1:
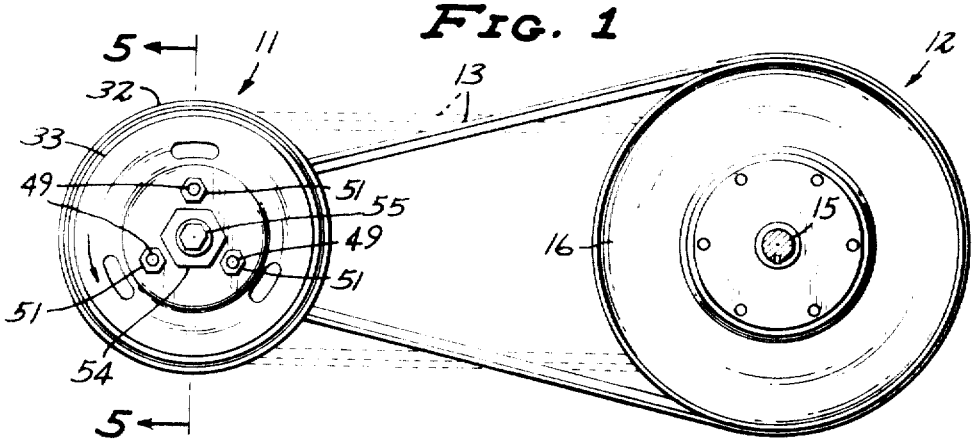
FIG. 1 is a side elevational view of a variable ratio centrifugal clutch consisting of a driving portion and a driven portion.
Figure 2:
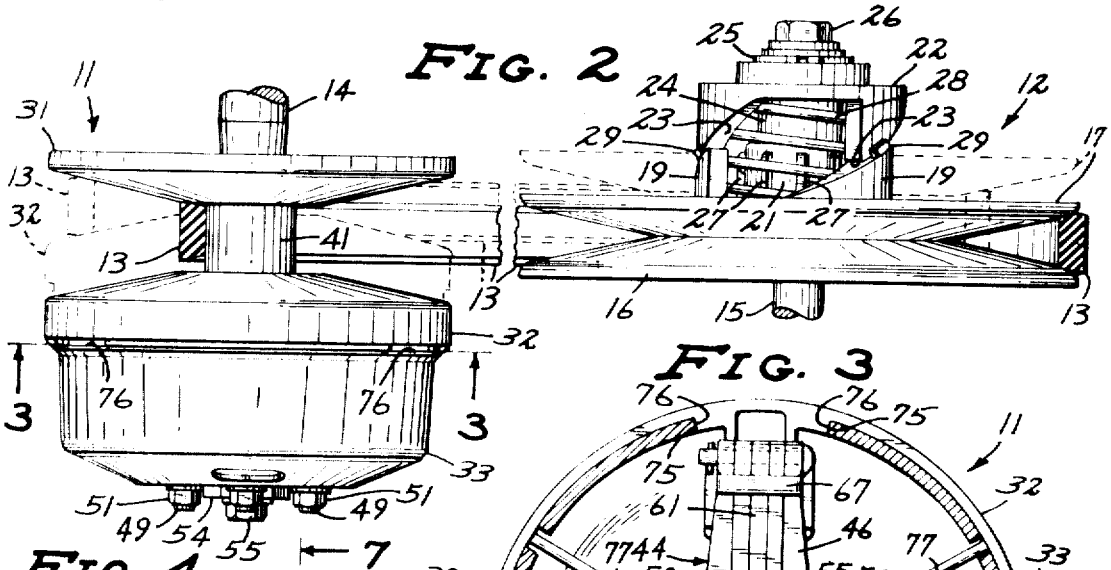
FIG. 2 is a top elevational view of the variable ratio centrifugal clutch, portions thereof broken away.

In FIG. 1, a variable ratio centrifugal clutch is shown, consisting of a driving assembly 11 and a driven assembly 12 interconnected by an endless belt 13. Referring additionally to FIG. 2, driving assembly 11 is shown to be mounted on an output drive shaft 14 of a power plant (not shown), while driven assembly 12 is mounted on an output shaft 15 adapted for connection with a utilization device (not shown). Driven assembly 12 consists of a stationary sheave 16 and a sheave 17 that is axially movable on shaft 15 as discussed below.

Forming part of sheave 17 are three ramp sections 19 (only two of which can be seen in FIG. 2) and a hub 21. A ramp member 22 includes three ramp surfaces 23 corresponding to ramp sections 19, and a central portion 24 which is suitably secured to shaft 15 such as by a slot-and-key or splining. A spring 28 is disposed in compression between sheave 17 and member 22, and the entire assembly is held in place by bolt 26 which threads into shaft 15. Hub 21 has a plurality of spacers 27 which keep spring 28 in proper alignment.

As assembled, sheave 17 is normally urged toward stationary sheave 16 by spring 28, but by application of a proper force spring 28 can be overcome so that sheave 17 moves both rotationally and axially by virtue of ramp sections 19 engaging ramp surfaces 23. In order to prevent excess wear therebetween, ramp surfaces 23 are provided with pads 29 which also provide a desired frictional relation between the two.

Driving assembly 11 also has a stationary sheave 31 fixed on shaft 14 and a movable sheave 32 (see also FIG. 4) that forms part of a movable housing 33. Housing 33 is normally urged away from sheave 31, but in response to an increasing angular velocity of shaft 14 moves axially forward as shown by the dotted lines in FIG. 2. Belt 13 normally occupies a slack position against shaft 14 when driving assembly 11 revolves slowly, but as housing 33 progresses axially it is forced radially outward, also as represented by dotted lines.

With the movements of belt 13 radially outward on driving assembly 11, movable sheave 17 of driven assembly 12 also begins to move away from sheave 16 against the bias of spring 28. However, before this can occur the coefficient of static friction existing between pads 29 and ramp sections 19 must be overcome. Rotation of both assemblies 11 and 12 is in the counterclockwise direction as seen in FIG. 1, so that when the static friction of pads 29 and the biasing force of spring 28 are overcome sheave 17 moves clockwise against belt movement, and the gripping force between belt 13 and sheaves 16 and 17 therefore remains great. Thus, for increasing angular velocity of shaft 14, housing 33 approaches stationary sheave 31 to move belt 13 radially outward from its slack position, which in turn causes belt 13 to move radially inward with respect to driving assembly 12, resulting in rotational movement of output shaft 15.

Since the radial position of belt 13 with respect to sheaves 31 and 32 of driving assembly 11 and sheaves 16, 17 of driven assembly 12 varies as a function of the angular velocity of shaft 14, it follows that the ratio of revolutions of the shaft 14 to revolutions of the shaft 15 also varies as a function of shaft 14 speed. At low r.p.m.'s, this ratio is infinite since shaft 14 revolves but belt 13, in its slack position, is unable to transmit rotational energy to driven assembly 12, and ouput shaft 15 cannot revolve. With increasing r.p.m.'s by shaft 14, this ratio is decreased since the radial distance of belt 13 from shaft 14 is increasing while its distance from that of shaft 15 is decreasing. By virtue of its variable ratio feature, the centrifugal clutch performs the function of both clutch and transmission.

Figure 5:
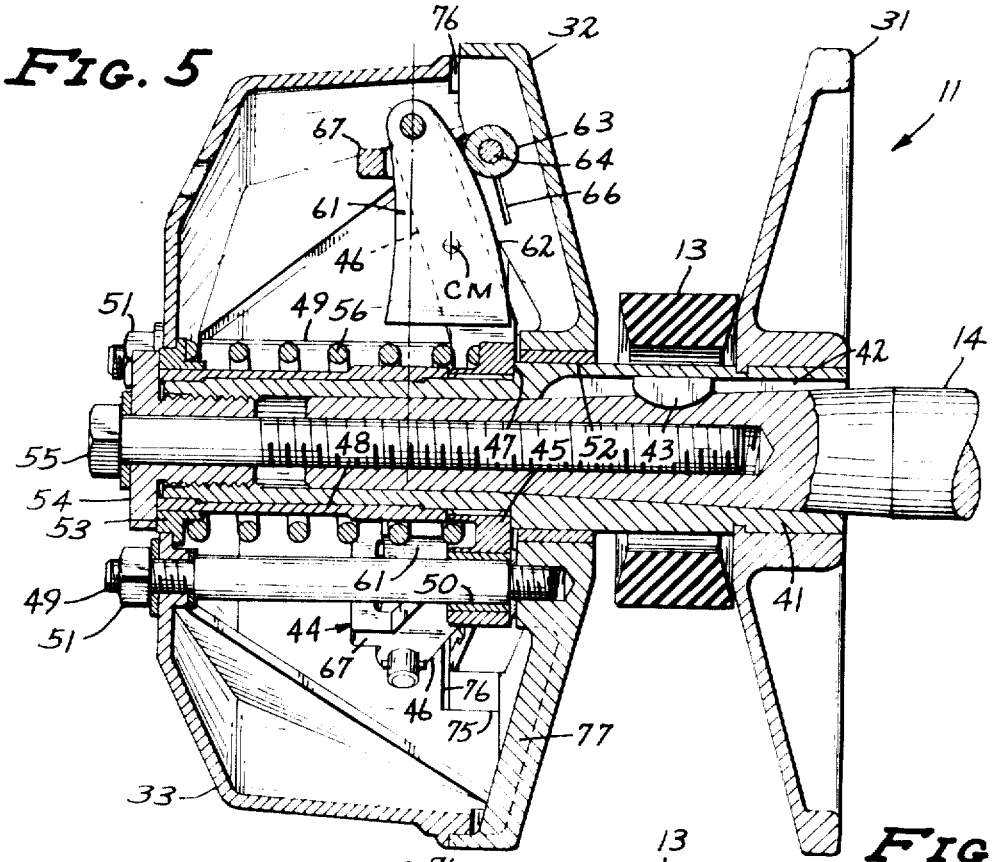
FIG. 5 is an enlarged sectional view of the clutch driving portion in one operating position, taken along line 5—5 of FIG. 1.
Figure 6:
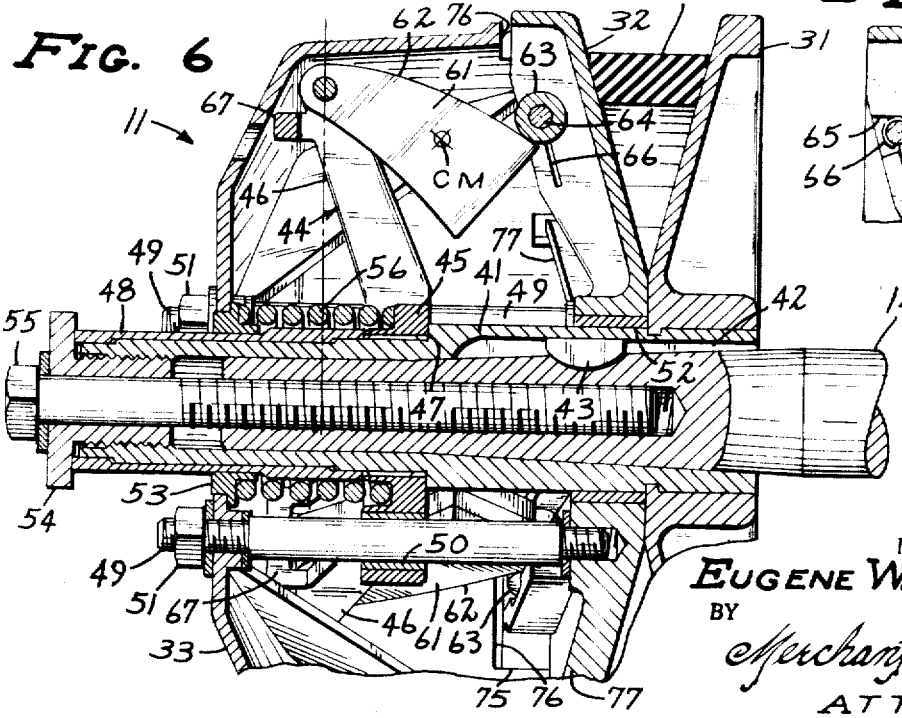
FIG. 6 is a view of FIG. 5 taken in another operating position, portions thereof broken away.

Referring to FIG. 5, which shows driving assembly 11 in detail, it can be seen that shaft 14 has a tapered end which receives an elongated sleeve 41. Sleeve 41 is affixed to shaft 14, by means of a slot 42 and a key 43, so that both members rotate together. Fixed sheave 31 is splined on sleeve 41 for rotation therewith.

Figure 3:
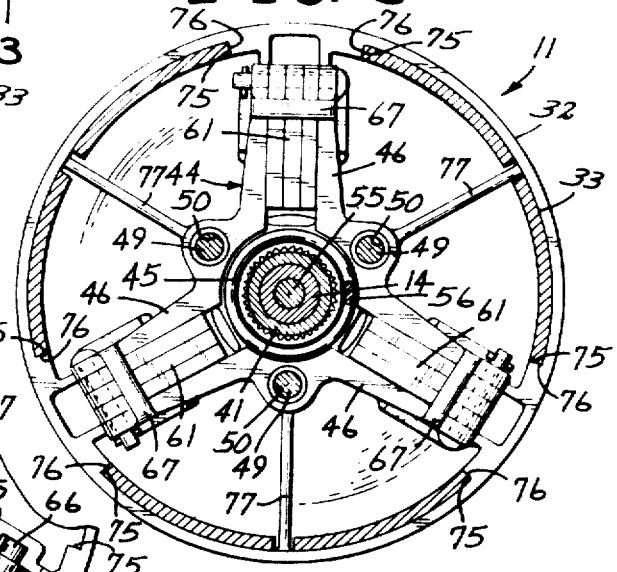
FIG. 3 is an enlarged cross-sectional view of the centrifugal clutch driving portion taken along the line 3—3 of FIG. 2.

A spider 44 consisting of a hub 45 and three radially extending arms 46 (see also FIG. 3) is splined on sleeve 41 for rotation therewith, and also abuts a stepped portion 47 of sleeve 41 to prevent axial movement to the righ. Each of the arms 46 has an alignment hole 50 the purpose of which is described below. A keeper 48 slides over sleeve 41 and abuts the opposite side of hub 45 to prevent axial movement of spider 44 to the left. In the preferred embodiment, housing 33 is bell-shaped with the open end facing sheave 32. To strengthen housing 33 and to resist stresses at its outer end, a plurality of triangular webs 77 are disposed on the inner surface of housing 33 between the open end and center of the housing.

Figure 4:
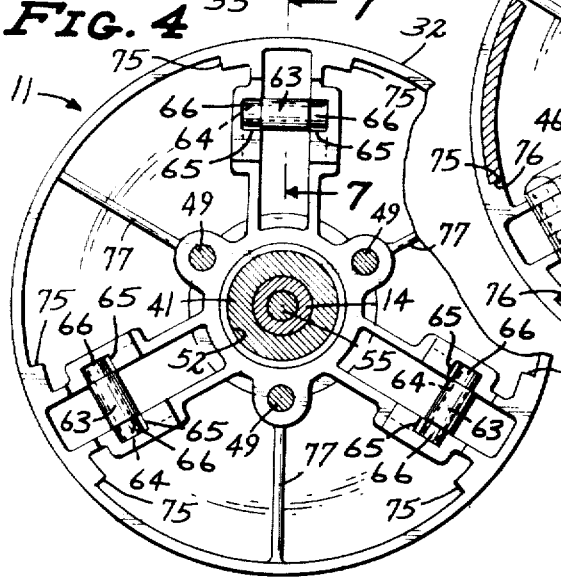
FIG. 4 is the same as FIG. 3 with parts thereof removed.

Sheave 32 has a flange portion of slightly greater diameter than the open end of housing 33 and thereby receives the end in overlapping relation. To prevent relative rotation between sheave 32 and housing 33, a plurality of shoulder portions 75 are formed on the inner face of the flange portion of sheave 32 (FIGS. 4–5). Corresponding recesses 76 are formed in housing 33 that laterally abut shoulder portions 75 when sheave 32 and housing 33 are brought together. Movable sheave 32 includes a bearing surface 52 which rides on sleeve 41 and forms a seal therewith. For the same purpose, housing 33 is provided with a collar 53 forming a bearing surface. This structural arrangement enables sheave 32 and housing 33 to completely enclose spider 44, thus preventing exposure to damaging substances. Studs 49 passing through holes 50 permit an aligned, axial movement of sheaves 32 and housing 33 on sleeve 41, and simultaneously carry these enclosure members in rotational movement.

The resulting enclosure for spider 44, as formed by movable sheave 32, housing 33 and studs 49, is extremely strong by virtue of its construction, and yet permits fully aligned and balanced operation.

The entire assembly is held in place by a cap 54 which is threaded into sleeve 41 to abut keeper 48. A central bolt 55 screws into a threaded portion of shaft 14 to bring shaft 14 and sleeve 41 into tight frictional engagement.

The movable portion of driving assembly 11, which consists of movable sheave 32, movable housing 33 and collar 53, is normally biased to the left (with respect to FIG. 5) against cap 54 by a spring 56 mounted in compression between hub 45 of spider 44 and collar 53.

Figure 7:
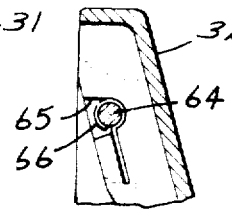
FIG. 7 is a fragmentary sectional view of a roller retaining member, taken along the line 7—7 of FIG. 4.

Pivotally connected to each of the arms 46 of spider 44 is a flyweight 61 having a predetermined shape and mass. The leading edge of each flyweight 61 forms a cam surface 62 that engages a low friction roller 63 carried by movable sheave 32. Roller 63 is carried by an axle 64, which, as shown in FIG. 7 is inserted into a recess 65 and held in place by a retainer clip 66 on each end.

With shaft 14 at rest, flyweights 61 occupy the position as shown in FIG. 5. As shaft 14 begins to rotate and for increasing rotational speed thereof, flyweights 61 swing upwardly and outwardly, moving the entire enclosure (sheave 32, housing 33 and studs 49) axially to the right by virtue of the engagement between cam surfaces 62 and rollers 63 and the resulting axial force created thereby. Since the entire enclosure moves with respect to spider 44 and flyweight 61, there is no telescoping or separation of enclosure sections, and protection is therefore maintained through the full range of operation.

What is claimed is:

[1. A centrifugal clutch comprising:

(a) rotatable shaft means;

(b) first rotatable means mounted on the shaft means and axially stationary thereon, the first rotatable means having a first clutching surface;

(c) second rotatable means mounted on the shaft means and comprising (i) a rotatable enclosure mounted on the shaft means and axially movable thereon, the rotatable enclosure forming a second clutching surface operating in association with the first clutching surface;

(ii) third rotatable means mounted on the shaft means and axially stationary thereon, the third rotatable means disposed within the enclosure;

(iii) and a plurality of flyweights pivotally mounted on one of said rotatable enclosure and said third rotatable means and arranged to move radially outward with increasing rotational velocity of the shaft means, the flyweights engageable with the other of said rotatable enclosure and said third rotatable means to effect said axial movement of the rotatable enclosure with respect to the first rotatable means.]

[2. The centrifugal clutch as defined in claim 1 wherein:

(a) the first rotatable means comprises a first sheave;

(b) and the rotatable enclosure comprises (i) a second sheave operating in association with the first sheave and axially movable on the shaft means;

(ii) an axially movable housing having an open end, the second sheave engageable with the housing to close the open end;

(iii) and means for holding the second sheave and the housing in tight engagement.]

[3. The centrifugal clutch as defined by claim 1, wherein the flyweights are mounted on the third rotatable means.]

[4. The centrifugal clutch as defined by claim 3, wherein the third rotatable member comprises a hub with a plurality of arms extending radially outward therefrom, and a flyweight is mounted on each of the arms.]

[5. The centrifugal clutch as defined by claim 3, wherein a low friction roller for each flyweight is mounted on the inner side of the rotatable enclosure for rolling engagement therewith.]

[6. The centrifugal clutch as defined by claim 2, wherein:

(a) the periphery of the second sheave forms a flange portion extending toward the housing and having a predetermined diameter;

(b) and the housing is bell-shaped, the open end having a diameter less than that of the flange portion and insertable therein in overlapping relation.]

[7. The centrifugal clutch as defined by claim 1, wherein:

(a) a plurality of openings are formed in the third rotatable means;

(b) and further comprising (i) a plurality of said members connecting opposite sides of the enclosure and disposed essentially parallel to the rotatable shaft means;

(ii) each of the stud members disposed in one of the openings and slidable movable therethrough.]

[8. The centrifugal clutch as defined by claim 1, and further comprising spring means disposed between said rotatable enclosure and said third rotatable means and arranged to normally bias the rotatable enclosure away from the first rotatable means.]

[9. The centrifugal clutch as defined by claim 8, wherein the spring means comprises a coil spring encircling the shaft means and disposed in compression.]

[10. The centrifugal clutch as defined by claim 1, wherein the rotatable enclosure slidably engages the shaft means, and further comprises bearing means for facilitating said slidable engagement.]

[11. The centrifugal clutch as defined by claim 6, wherein the bell-shaped housing further includes a plurality of strengthening webs disposed on the inner side of the housing and extending from a point near the open end toward the center of the housing.]

[12. The centrifugal clutch as defined by claim 6, wherein :

(a) the second sheave further includes shoulder portions disposed on the inner face of the flange portion;

(b) and the insertable end of the bell-shaped housing is constructed to receive and laterally abut the shoulder portions.]

[13. The centrifugal clutch as defined by claim 6, wherein:

(a) a plurality of openings are formed in the housing corresponding with the openings in the third rotatable means;

(b) and the means for holding the second sheave and housing comprises (i) a plurality of studs affixed to the second sheave, each of the studs slidably extending through one of the openings in the third rotatable means and a corresponding one of the openings in the housing;

(ii) and fastening means on each of the studs for tightening the housing against the second sheave.]

[14. A centrifugal clutch comprising:

rotatable shaft means;

first rotatable means mounted on the shaft means and axially stationary thereon, the first rotatable means havinfig a first clutching surface;

second rotatable means mounted on the shaft means and comprising a rotatable enclosure mounted on the shaft means axially movable thereon, the rotatable enclosure forming a second clutching surface operating in association with the first clutching surface;

third rotatable means mounted on the shaft means within said rotatable enclosure; and a plurality of flyweights pivotally mounted on one of said rotatable enclosure and said third rotatable means and arranged to move radially outward with increasing rotation velocity of the shaft means, the flyweights engagement with the other of said rotatable enclosure and said third rotatable means to effect said axial movement of of rotatable enclosure with respect to the first rotatable means.]

[15. A centrifugal clutch comprising:

rotatable shaft means;

first rotatable means mounted on the shaft means and axially stationary thereon, the first rotatable means having a first clutching surface;

second rotatable means mounted on the shaft means and comprising a rotatable enclosure mounted on the shaft means and axially movable thereon, the rotatable enclosure forming a second clutching surface operating in association with the first clutching surface; and actuating means within said rotatable enclosure for effecting axial movement thereof with respect to the first rotatable means, said actuating means including a plurality of flyweights and means for operatively mounting said flyweights within the rotatable enclosure, the flyweights constructed and arranged to move radially outward with increasing rotational velocity of the shaft means and to exert a resulting axial force on the rotatable enclosure to effect said axial movement.]

[16. A centrifugal clutch comprising:

rotatable shaft means;

a rotatable enclosure mounted on the shaft means and axially movable thereon, said rotatable enclosure carrying a first clutching surface;

first rotatable means mounted on the shaft means and axially stationary thereon, the first rotatable means disposed within the rotatable enclosure;

a plurality of flyweights mounted on one of said rotatable enclosure and said first rotatable means and arranged to move radially outward with increasing rotational velocity of the shaft means, the flyweights being engageable with the other of said rotatable enclosure and first rotatable means to effect axial movement of the rotatable enclosure on the shaft means; and second rotatable menas including a second clutching surface for operating in clutching relationship with the first clutching surface and for providing an output for the centrifugal clutch which varies as a function of rotational velocity of the shaft means.]

*17. A centrifugal clutch, comprising:*

*(a) rotatable shaft means;*

*(b) first rotatable means mounted on the shaft means for rotation therewith and axially stationary thereon, the first rotatable means having a first clutching surface;*

*(c) second rotatable means mounted on the shaft means for rotation therewith and defining a second clutching surface operable in association with the first clutching surface, the second rotatable means including a bearing support portion engageable with the rotatable shaft means to permit axial movement thereover;*

*(d) third rotatable means mounted on the shaft means for rotation therewith and including a bearing support portion engageable with the rotatable shaft means to permit axial movement thereover;*

*(e) said second and third rotatable means being constructed and arranged to cooperably merge and define a rigid rotatable enclosure with the bearing support portions axially spaced to provide distributed*

*bearing support for the rigid enclosure as it moves axially over the rotatable shaft means;*

*(f) a plurality of structural support means interconnecting opposed sides of the second and third rotatable means, said structural support means being equiangularly spaced between the rotatable shaft means and the extreme periphery of the rotatable enclosure;*

*(g) fourth rotatable means mounted on the shaft means for rotation therewith and axially stationary thereon, the fourth rotatable means being disposed within the rotatable enclosure;*

*(h) a plurality of flyweights pivotally mounted on one of the rotatable enclosure and the fourth rotatable means and arranged to move radially outward with increasing rotational velocity of the shaft means, each of said flyweights being engageable with the other of said rotatable enclosure and the fourth rotatable means to effect axial movement of the rotatable enclosure toward the first rotatable means;*

*(i) and coil spring means encircling the rotatable shaft means and disposed to normally urge the rotatable enclosure away from the first rotatable means.*

*18. The centrifugal clutch defined by claim 17, wherein at least a portion of each of said structural support means threadably engages one of the second and third rotatable means.*

*19. The centrifugal clutch defined by claim 17, wherein each of said structural support means movably engages the fourth rotatable means in guided relation therewtih.*

*20. The centrifugal clutch defined by claim 19, wherein said structural support means comprise elongated stud members extending through appropriately disposed openings in said fourth rotatable means.*

*21. The centrifugal clutch defined by claim 17, wherein the coil spring means is compressibly disposed between the rotatable enclosure and fourth rotatable means.*

*22. The centrifugal clutch defined by claim 17, wherein the first and second clutching surfaces comprise sheaves.*

*23. A centrifugal clutch, comprising:*

*(a) rotatable shaft means;*

*(b) first rotatable means mounted on the shaft means for rotation therewith and axially stationary thereon, the first rotatable means having a first clutching surface;*

*(c) second rotatable means mounted on the shaft means for rotation therewith and defining a second clutching surface operable in association with the first clutching surface, the second rotatable means including a bearing support portion engageable with the rotatable shaft means to permit axial movement thereover;*

*(d) third rotatable means mounted on the shaft means for rotation therewith and including a bearing support portion engageable with the rotatable shaft means for rotation therewith and including a bearing support portion engageable with the rotatable shaft means to permit axial movement thereover;*

*(e) said second and third rotatable means being constructed and arranged to cooperably merge and define a rigid rotatable enclosure with the bearing support portions axially spaced to provide distributed bearing support for the rigid enclosure as it moves axially over the rotatable shaft means;*

*(f) fourth rotatable means mounted on the shaft means for rotation therewith and axially stationary thereon, the fourth rotatable means being disposed within the rotatable enclosure;*

*(g) a plurality of flyweights pivotally mounted on one of the rotatable enclosure and the fourth rotatable means and arranged to move radially outward with increasing rotational velocity of the shaft means, each of said flyweights having a cam surface engageable with the other of said rotatable enclosure and fourth rotatable means and characterized to effect a predetermined mode of movement of the rotatable enclosure relative to the first rotatable means;*

*(h) and coil spring means encircling the rotatable shaft means and disposed to normally urge the rotatable enclosure away from the first rotatable means.*

*24. The centrifugal clutch defined by claim 23, and further comprising a plurality of low friction bearing members disposed on the other of said rotatable enclosure and fourth rotatable means for respective engagement by the cam surfaces of said plurality of flyweights.*

*25. The centrifugal clutch defined by claim 24, wherein the fourth rotatable means comprises a hub with a plurality of arms extending radially outward therefrom, the outer end of each of said arms having said flyweight or low friction bearing member mounted thereon.*

*26. The centrifugal clutch defined by claim 24, wherein the low friction bearing members comprise rollers.*

*27. The centrifugal clutch defined by claim 23, wherein each of said flyweights is replaceably mounted on said one of the rotatable enclosure and fourth rotatable means.*

*28. A centrifugal clutch, comprising:*

*(a) rotatable shaft means;*

*(b) first rotatable means mounted on the shaft means for rotation therewith and axially stationary thereon, the first rotatable means having a first clutching surface;*

*(c) second rotatable means mounted on the shaft means for rotation therewith and defining a second clutching surface operable in association with the first clutching surface, the second rotatable means including a bearing support portion engageable with the rotatable shaft means to permit axial movement thereover;*

*(d) third rotatable means mounted on the shaft means for rotation therewith and including a bearing support portion engageable with the rotatable shaft means to permit axial movement thereover;*

*(e) said second and third rotatable means being constructed and arranged to cooperably merge and define a rigid rotatable enclosure with the bearing support portions axially spaced to provide distributed bearing support for the rigid enclosure as it moves axially over the rotatable shaft means;*

*(f) fourth rotatable means mounted on the shaft means for rotation therewith and axially stationary thereon, the fourth rotation means being disposed within the rotatable enclosure;*

*(g) a plurality of flyweights of pivotally mounted on one of the rotatable enclosure and the fourth rotatable means and arranged to move radially outward with increasing rotational velocity of the shaft means, each of said flyweights being engageable with the other of said rotatable enclosure and the fourth rotable means to effect axial movement of the rotatable enclosure relative to the first rotatable means;*

*(h) said second, third and fourth rotatable means being removable from the shaft means as a unit.*

*29. The centrifugal clutch defined by claim 28, and further comprising coil spring means encircling the rotatable shaft means and disposed to normally urge the rotatable enclosure away from the first rotatable means.*

*30. The centrifugal clutch defined by claim 29, wherein the coil spring means is constructed and arranged to be removed with the second, third and fourth rotatable means.*

*31. The centrifugal clutch defined by claim 28, wherein the fourth rotatable means is secured to the shaft means for rotation therewith; the rotatable enclosure is constructed for engagement by and rotational movement with the fourth rotatable means; and further comprising removable keeper means for maintaining the fourth rotational means in said axially stationary position.*

*32. The centrifugal clutch defined by claim 31, wherein the keeper means comprises:*

*(a) abutment means disposed on the shaft means, the fourth rotatable means being disposed in abutting engagement therewith;*

(*b*) *a keeper member urging the fourth rotatable means against the abutment means;*

(*c*) *and a removable member cooperable with the shaft means for locking the keeper member against the fourth rotatable means.*

References Cited

The following references, cited by the Examiner, are of record in the patented file of this patent or the original patent.

UNITED STATES PATENTS

| | | | |
|---|---|---|---|
| 3,574,366 | 4/1971 | Thostenson | 74—230.17 E |
| 3,230,787 | 1/1966 | Siegal | 74—230.17 E |
| 2,317,339 | 4/1943 | Steven | 74—230.17 E |

| | | | |
|---|---|---|---|
| 3,226,994 | 1/1966 | Harley | 74—230.17 E |
| 3,017,783 | 1/1962 | Brugghen et al. | 74—230.17 E |
| 2,622,446 | 12/1952 | Shaw | 74—230.17 E |
| 2,543,967 | 3/1951 | Heyer | 74—230.17 E |
| 2,310,081 | 2/1943 | Hill | 74—230.17 E |
| 3,066,546 | 12/1962 | Thostenson | 74—230.17 CC |
| 3,266,330 | 8/1966 | Galleher | 74—230.17 |
| 3,280,648 | 10/1966 | Nelson | 74—230.17 |
| 3,393,572 | 7/1968 | Larsson | 74—230.17 |

CHARLES J. MYHRE, Primary Examiner

R. H. LAZARUS, Assistant Examiner